(No Model.)
F. C. VICKERS.
HORSE DETACHER.
No. 420,523. Patented Feb. 4, 1890.
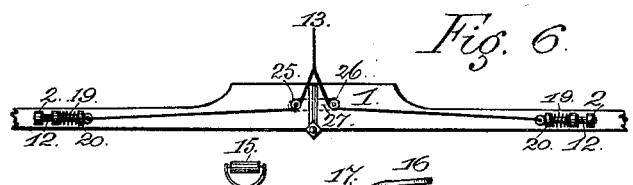
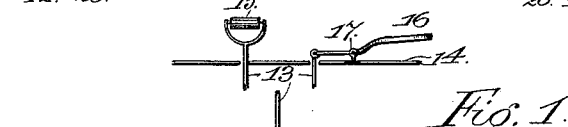
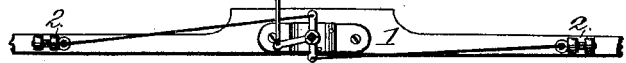
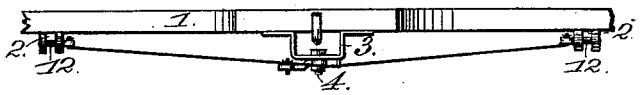
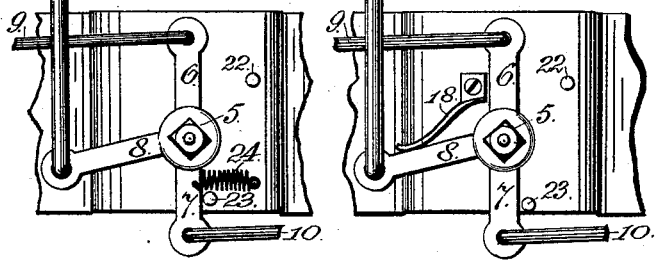
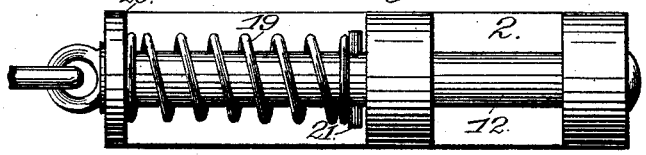
WITNESSES:
Wm. Kowalski
Wm. M. Cornell
INVENTOR
Frank C. Vickers
BY
A. J. O'Brien
his ATTORNEY

UNITED STATES PATENT OFFICE.

FRANK C. VICKERS, OF PUEBLO, COLORADO.

HORSE-DETACHER.

SPECIFICATION forming part of Letters Patent No. 420,523, dated February 4, 1890.

Application filed September 21, 1889. Serial No. 324,706. (No model.)

*To all whom it may concern:*

Be it known that I, FRANK C. VICKERS, a citizen of the United States, residing at Pueblo, in the county of Pueblo and State of Colorado, have invented certain new and useful Improvements in Devices for Detaching the Shafts from Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in devices for detaching the shafts or tongue from vehicles, said improvements being capable of successful operation by the driver while sitting in the vehicle.

The object of my improvement, therefore, is to provide a device of the class stated whereby in case the animal or team hitched to the vehicle starts to run away and becomes unmanageable the driver, without moving from his seat, may quickly and easily detach the shafts or tongue from the vehicle and let the horse or team go—a device which shall consist of few parts, be economical in cost, easily operated, efficient, durable, and reliable; to which ends my invention consists of the features, arrangements, and combinations hereinafter described and claimed.

In the drawings is illustrated an embodiment of my invention, in which drawings—

Figure 1 is a front elevation of the device attached to the forward axle of the vehicle. Fig. 2 is a plan or top view of the same. Fig. 3 is an enlarged detail view of a portion of the mechanism. Fig. 4 is the same as Fig. 3, except that a different spring is shown. Fig. 5 is an enlarged detail view showing another modification of the spring. Fig. 6 shows a modified form of mechanism for carrying out my improvement.

In the drawings, let the reference-numeral 1 indicate the front axle of the vehicle, to which are secured the sockets or clips 2 for the rear extremities of the shafts or tongue. To the central forward portion of axle 1 is secured the bracket 3, the central part of which is removed from the axle sufficiently to allow the attachment thereto of a pivot 4, upon which is secured a hub 5, provided with arms 6, 7, and 8. Hub 5 is permitted to turn freely upon the pivot, or the pivot may turn within the bracket, the hub being stationary on the pivot. Arms 6 and 7 stand in a vertical position on opposite sides of the hub. Arm 8 projects from the hub between arms 6 and 7, being inclined downward, forming an acute angle with arm 7 and an obtuse angle with arm 6. This is the relative position of the arms shown in the drawings; but I do not limit myself to this relative position of the arms, as I am aware other positions may also be employed.

To the outer extremity of arms 6 and 7 are hinged draw-rods 9 and 10, respectively, each of which is hinged to a suitable locking-bolt 12, adapted to secure the rear extremities of the shafts or tongue of the vehicle in sockets 2.

Hinged to the outer extremity of the arm 8 is a rod, wire, cord, or leather strap 13, extending up through a suitable aperture in the body 14 of the vehicle. The top of rod 13 is provided with a suitable handle 15, located within convenient reach of the driver while sitting in the vehicle, or one extremity of a lever 16 may be hinged to the top of rod 13 and provided with a suitable fulcrum 17, secured to the bottom of the vehicle-body. Lever 16 may be operated by the foot of the driver.

In Fig. 3 is shown a spring 18, secured to bracket 3 above arm 8, upon which arm said spring is adapted to act.

In Fig. 4 is shown a spiral spring 24, adapted to act on arm 7.

In Figs. 5 and 6 is shown a spiral spring 19, located upon bolt 12 between a shoulder 20 and a pin 21. The use of this spring requires a modification of bolts 12, as shown in Fig. 5. Shoulder 20 is stationary upon the axle, being provided with an opening for the reception of the bolt 12, said bolt moving freely within said opening. Pin 21 is secured to bolt 12.

When spring 19 is used, leather straps or cords 9 and 10 may take the place of the rods indicated by the same numbers, said straps or cords passing over pulleys 25 and 26, secured to the axle, the straps being prevented from slipping off the pulleys by a suitable plate 27, connecting the forward extremity of the axis of the pulleys, or instead of pulleys 25 and 26 and their connecting-plate 27 suitable guides or eyes might be secured to the axle, one for each strap or cord.

When the mechanism just described is used, the two straps 9 and 10 unite above their guides or pulleys in the single strap, cord, or rod 13. The mechanism just described is illustrated in Fig. 6.

Bracket 3 is provided with pins 22 and 23, located as shown.

In the operation of my improved device the driver, while sitting in the vehicle, grasps the handle 15 and draws upward or presses upon the lever 16 with the foot. In either case, power being applied to rod 13 in an upward direction, arm 8 is raised and sufficient action is given to arms 6 and 7 to draw bolts 12 from sockets or clips 2 sufficiently to detach the shafts or tongue from the vehicle, at the same time not entirely removing the bolts from the eyes of the inner lugs of sockets 2. The pin 22 prevents arm 6 from moving far enough to draw the bolts 12 entirely out. As soon as the application of power to rod 13 has ceased the bolts 12 return to their original position by virtue of the direct action of spring 19, or by virtue of the indirect action of springs 18 or 24 upon arms 8 or 7, respectively. The operation of the device, when the modified form illustrated in Fig. 6 is used, will be observed without further explanation. The influence of the action of these springs will be readily observed. I do not limit myself to any particular form of the spring or the location thereof for this purpose; but it is thought that a spring 19, located on the bolt 12 between the outer extremities of rods 9 and 10 and the socket 2, as shown in Figs. 5 and 6, will be found preferable, for the reason that this spring accomplishes the desired purpose—namely, of returning pins 12 to and retaining them in their position in sockets 2 whether rods 9 and 10 are rigid or flexible, since with spring 19 rods 9 and 10 might be cords or straps of sufficient strength to bear the power applied in drawing bolts 12, as shown in Fig. 6.

Having thus described my invention, what I claim is—

1. A device for detaching the shafts or tongue from vehicles, consisting of arms 6, 7, and 8, rigidly secured to a hub 5, as shown, said hub being suitably pivoted to the forward axle of the vehicle, rods 9 and 10, hinged to arms 6 and 7, respectively, at their inner extremities and to locking-bolts 12 at their outer extremities, shoulders 20, secured to the axle and provided with openings through which bolts 12 pass, pins 21, secured to bolts 12, springs 19 upon bolts 12, between shoulders 20 and pins 21, and a rod or strap of any kind 13, hinged to arm 8 and extending upward therefrom any suitable distance, substantially as described.

2. In a device for detaching the shafts or tongue from vehicles, the combination, with the forward axle, clips attached thereto, and locking-bolts, of rods 9 and 10, hinged to the locking-bolts, and suitable means centrally located upon the axle of applying power to rods 9 and 10 for the purpose of withdrawing the locking-bolts, shoulders 20, secured to the axle and provided with openings through which the locking-bolts pass, pins 21, secured to the locking-bolts, and a spiral spring 19 upon said bolts between shoulders 20 and pins 21, substantially as described.

3. In a device for detaching the shafts or tongue from vehicles, the combination, with the forward axle, clips attached thereto, and locking-bolts, of a hub 5, centrally pivoted to the axle and provided with radial arms 6, 7, and 8, rods 9 and 10, hinged to arms 6 and 7, respectively, at their inner extremities and hinged to the locking-bolts at their outer extremities, and means connected with arm 8 for turning the hub 5 upon its pivot and withdrawing the locking-bolts, shoulders 20, secured to the axle and provided with openings through which the locking-bolts pass, pins 19, or their equivalents, secured to the locking-bolts, each of said bolts being provided with a spring 19, located thereon between shoulders 20 and pins 21, substantially as described.

4. In a device for detaching the shafts or tongue from vehicles, the combination, with the forward axle, suitable clips or sockets for the shafts or tongue attached to the axle, and locking-bolts, of a hub 5, centrally pivoted upon the axle, the hub being provided with radial arms 6, 7, and 8, rigidly secured thereto, rods 9 and 10, hinged at their inner extremities to arms 6 and 7, respectively, and at their outer extremities to suitable locking-bolts 12, and a rod or its equivalent hinged or attached to arm 8 at one extremity and extending upward sufficiently to be within reach of the driver, and a spring 18, acting on arm 8 to return the locking-bolts to their original position, substantially as described.

5. In a device for detaching the shafts or tongue from vehicles, the combination, with the forward axle, clips, and locking-bolts, of a bracket 3, secured to the axle and centrally located thereon, a pivot 4, suitably secured to bracket 3 and allowed to turn freely thereon, arms 6, 7, and 8, rigidly secured to pivot 4, rods 9 and 10, having their inner extremities hinged to arms 6 and 7, respectively, and their outer extremities hinged to locking-bolts 12, a rod or its equivalent hinged to arm 8 and extending upward therefrom any desired distance, and a spiral spring 24, secured to bracket 3 and acting on arm 7, substantially as described.

6. In a device for detaching the shafts or tongue from vehicles, the combination, with the forward axle and clips secured thereto, of locking-bolts 12, shoulders 20, made fast to the axle and provided with openings through which bolts 12 pass, pins 21, or their equivalents, secured to bolts 12, each of said bolts being provided with a spiral spring 19, located between pins 21 and shoulders 20, bracket 3, centrally located upon the axle, a pivot 4, secured to the bracket and turning freely thereon, radial arms 6, 7, and 8, rigidly secured to the pivot 4, rods 9 and 10, or their equivalents, hinged at their outer extremities to bolts 12, and a rod or strap or equivalent device hinged to arm 8 and extending upward therefrom any desired distance, substantially as described.

7. In a device for detaching the tongue or shafts from vehicles, locking-bolts 12, shoulders 20, made fast to the axle and provided with openings through which bolts 12 pass, pins 21, or their equivalents, secured to bolts 12, bolts 12 being provided with springs 19, located thereon between shoulders 20 and pins 21, straps or cords 9 and 10, secured to these bolts, guides or pulleys secured to the axle, through or upon which straps 9 and 10 work, and a strap 13, or its equivalent, connected with straps 9 and 10 and extending upward therefrom any suitable distance, substantially as described.

8. The combination, with the front axle and clips made stationary thereon, of bolts 12, adapted to lock the tongue or shafts directly to the clips, shoulders 20, made fast to the axle and provided with openings through which bolts 12 pass, pins 21, or their equivalents, secured upon bolts 12, bolts 12 being provided with springs 19, located thereon between pins 21 and shoulders 20, straps or cords 9 and 10, secured to these bolts, guides or pulleys secured to the axle, through or upon which straps 9 and 10 work, and a strap 13, or its equivalent, connected with straps 9 and 10 and extending upward therefrom any suitable distance, substantially as described.

9. The combination, with the forward axle of a vehicle, provided with stationary clips, of locking-bolts 12, adapted to lock the shafts or tongue directly to the clips, stationary shoulders 20, provided with openings through which bolts 12 pass, pins 21, or their equivalents, secured to bolts 12, said bolts being provided with springs 19, located thereon between pins 21 and shoulders 20, and suitable means for withdrawing the locking-bolts from the clips, substantially as described.

In testimony whereof I affix my signature in presence of two witnesses.

FRANK C. VICKERS.

Witnesses:
CHAS. W. BOWMAN,
JNO. O. ALBERT.